US008484202B2

(12) United States Patent
Radlinski et al.

(10) Patent No.: US 8,484,202 B2
(45) Date of Patent: Jul. 9, 2013

(54) OPTIMIZING BLENDING ALGORITHMS USING INTERLEAVING (75) Inventors: Filip Radlinski, Vancouver (CA); Nick Craswell, Seattle, WA (US); Peter Bailey, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/964,353

(22) Filed: Dec. 9, 2010

(65) Prior Publication Data
US 2012/0150837 A1 Jun. 14, 2012

(51) Int. Cl.
*G06F 7/06* (2006.01)

(52) U.S. Cl.
USPC ........................................... 707/723

(58) Field of Classification Search
None
See application file for complete search history.

(56) References Cited

U.S. PATENT DOCUMENTS

| | | | |
|---|---|---|---|
| 5,826,260 A * | 10/1998 | Byrd et al. ............................ | 1/1 |
| 6,701,311 B2 * | 3/2004 | Biebesheimer et al. ............... | 1/1 |
| 7,219,090 B2 * | 5/2007 | Travis, Jr. ............................ | 1/1 |
| 7,346,613 B2 * | 3/2008 | Hurst-Hiller et al. ......... | 707/711 |
| 7,447,678 B2 | 11/2008 | Taylor et al. | |
| 7,958,116 B2 * | 6/2011 | House et al. ................... | 707/723 |
| 8,086,600 B2 * | 12/2011 | Bailey et al. ................... | 707/723 |
| 2004/0215607 A1 * | 10/2004 | Travis, Jr. ......................... | 707/3 |
| 2005/0165777 A1 * | 7/2005 | Hurst-Hiller et al. ............. | 707/4 |
| 2006/0287980 A1 * | 12/2006 | Liu et al. ............................ | 707/2 |
| 2007/0112949 A1 * | 5/2007 | Lunenfeld ....................... | 709/223 |
| 2008/0140647 A1 * | 6/2008 | Bailey et al. ....................... | 707/5 |
| 2008/0183699 A1 * | 7/2008 | Hu et al. ............................. | 707/5 |
| 2009/0019030 A1 * | 1/2009 | Smolyanskiy ..................... | 707/5 |
| 2009/0019035 A1 * | 1/2009 | House et al. ....................... | 707/5 |
| 2010/0082609 A1 * | 4/2010 | Sun et al. ....................... | 707/723 |
| 2010/0153371 A1 * | 6/2010 | Singh ............................. | 707/722 |
| 2010/0223134 A1 * | 9/2010 | Lunenfeld .................. | 705/14.54 |
| 2011/0258080 A1 * | 10/2011 | Lunenfeld .................. | 705/26.61 |
| 2012/0066200 A1 * | 3/2012 | Lunenfeld ..................... | 707/709 |
| 2012/0084139 A1 * | 4/2012 | Pradeep et al. ............. | 705/14.41 |
| 2012/0089599 A1 * | 4/2012 | Bailey et al. ................. | 707/723 |
| 2012/0089601 A1 * | 4/2012 | Bailey et al. ................. | 707/723 |
| 2012/0191689 A1 * | 7/2012 | Lunenfeld ..................... | 707/707 |

OTHER PUBLICATIONS

Sullivan, "Search 3.0: The Blended & Vertical Search Revolution," published on Nov. 27, 2007.*
Yisong Yue, et al., More Powerful Test Statistics for Click-Based Retrieval Evaluation—Published Date: Jul. 19, 2010 http://olivier.chapelle.cc/pub/fp814-yue.pdf.
Ben Carterette, et al., Evaluating Search Engines by Modeling the Relationship Between Relevance and Clicks—Published Date: Dec. 2007 http://www-2.cs.cmu.edu/~rosie/papers/nips07.pdf.
Ning Liu, et al., A Probabilistic Model based Approach for Blended Search—Published Date: Apr. 20, 2009 http://www.www2009.org/proceedings/pdf/p1075.pdf.

* cited by examiner

*Primary Examiner* — Hung Q Pham
*Assistant Examiner* — Hubert Cheung
(74) *Attorney, Agent, or Firm* — Shook, Hardy & Bacon LLP (57) ABSTRACT

Methods and computer-readable media are provided for interleaving multiple sets of blended search results to identify a preferred set of blended search results for a search query or for a category of search queries. A search query is received and routed to multiple ranking systems, which return search results that are blended into sets of blended search results. Interleaving experiments are performed to determined, based on user preferences, which set of blended search results are preferred for that particular search query. Based on the outcome, a preferred blending algorithm is identified.

20 Claims, 5 Drawing Sheets

OPTIMIZING BLENDING ALGORITHMS USING INTERLEAVING

BACKGROUND

The amount of information and content available on the Internet continues to grow exponentially. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

In finding relevant web pages, multiple ranking systems may be used. It may, however, be difficult to determine which ranking system is providing the most useful results to users. Further, individual ranking systems may not be able to provide the most relevant search results to a user based on a search query.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to identifying a preferred set of search results for a particular query based on an optimal blending algorithm. Blended search results include search results from two or more ranking systems, and based on interleaving experiments, it can be determined whether one set of blended search results is preferred over another set of blended search results or even search results returned from an individual ranking system. Once the optimal blending algorithm is identified, it can be associated with a search query or even a particular category of search queries and used next time that search query is submitted through a search engine. The optimal blending algorithm has multiple parameters that have been adjusted based on the outcome of interleaving experiments. In embodiments, the optimal blending algorithm for a particular query or group of queries may consist solely of the search results from just one ranking system. As such, embodiments provide for a process that includes selecting a particular blend to use for a particular query, blending by combining the search results from one or more ranking systems. Lastly, interleaving is used to select the best blending parameters or the best ranking parameters that contribute to the blend.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide for determining an optimal blend of two or more ranking systems such that the search results from these ranking systems are blended in a certain manner to produce blended search results that are most preferred by users. In one instance, the optimal blending algorithm may include only those search results from a single ranking system, but in alternative embodiments, a blending algorithm includes search results from two or more ranking systems such that these results are blended together. The optimal blending algorithm may be determined, for instance, by interleaving experiments. In one instance, the optimal blending algorithm, because of its dependency on a search query, may be associated with a search query. This association may be stored in a database so that it can be retrieved in the future when that particular search query is submitted by way of a search engine, for example. Alternatively, an association may be made between an optimal blending algorithm and a category of search queries so that the optimal blending algorithm can be used when any search query in that category is submitted. Generally, embodiments of the present invention include multiple ranking systems producing search results, blending those search results in a particular way, and interleaving two or more sets of blended search results to determine which is preferred by users. Additionally, various parameters of blending algorithms can be adjusted such that when interleaved, it can be determined if a parameter adjustment was preferred or not preferred by users.

Accordingly, in one aspect, an embodiment of the present invention is directed to one or more computer-readable media storing computer-useable instructions that, when used by a computing device, cause the computing device to perform a method for performing interleaving experiments on blended search results. The method includes receiving a search query, communicating the search query to multiple ranking systems, and receiving a set of search results from each of the multiple ranking systems. Further, the method includes generating two or more sets of blended search results. Each set of blended search results is comprised of a portion of the search results received from two or more of the multiple ranking systems. Additionally, the method includes performing interleaving experiments on the two or more sets of blended search results to identify preferred blended search results and based on the preferred blended search results, determining a preferred blending algorithm.

In another embodiment, an aspect of the invention is directed to one or more computer-readable media storing computer-useable instructions that, when used by a computing device, cause the computing device to perform a method for performing interleaving experiments on blended search results. The method includes identifying a first version of a blending algorithm that blends search results produced by a first ranking system and a second ranking system to produce a first set of blended search results based on a search query. Further, the method includes varying a first parameter of the first ranking system to create a second version of the blending algorithm that produces a second set of blended search results based on the search query. The first set and the second set of blended search results are interleaved to generate an interleaved set of search results. Additionally, the method includes performing an interleaving experiment for the search query using the interleaved set of search results and based on the interleaving experiment, determining which of the first version or the second version of the blending algorithm is preferred by users who receive the interleaved set of search results.

A further embodiment of the invention is directed to one or more computer-readable media storing computer-useable instructions that, when used by a computing device, cause the computing device to perform a method for performing interleaving experiments on blended search results. The method includes identifying a plurality of search query categories and for search queries that belong to a first category of search queries, identifying two or more blending algorithms that blend search results produced by two or more ranking systems to generate blended search results. Further, the method includes performing interleaving experiments on the two or more blending algorithms to determine an optimal blending algorithm and associating the optimal blending algorithm with the first category of search queries.

Figure 1:
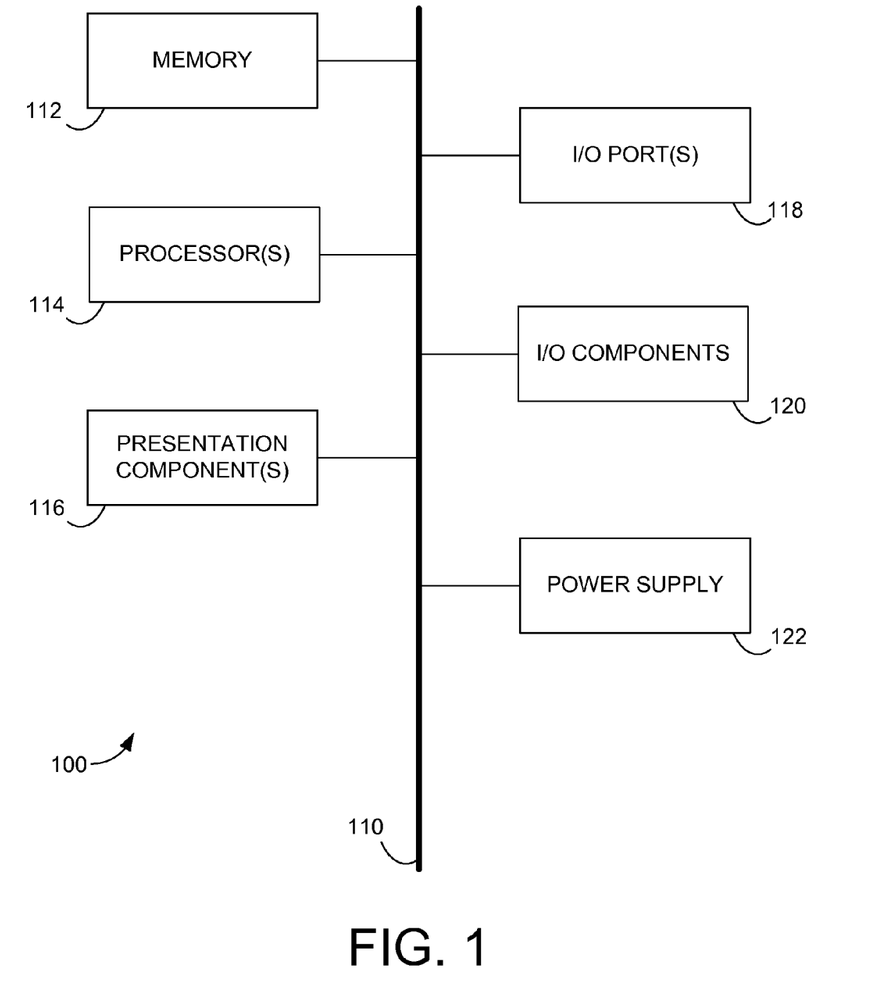
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media implemented in any method or technology for storage of information such as computer-readable instructions, computer-storage media, data structures, program modules, or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above are also included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
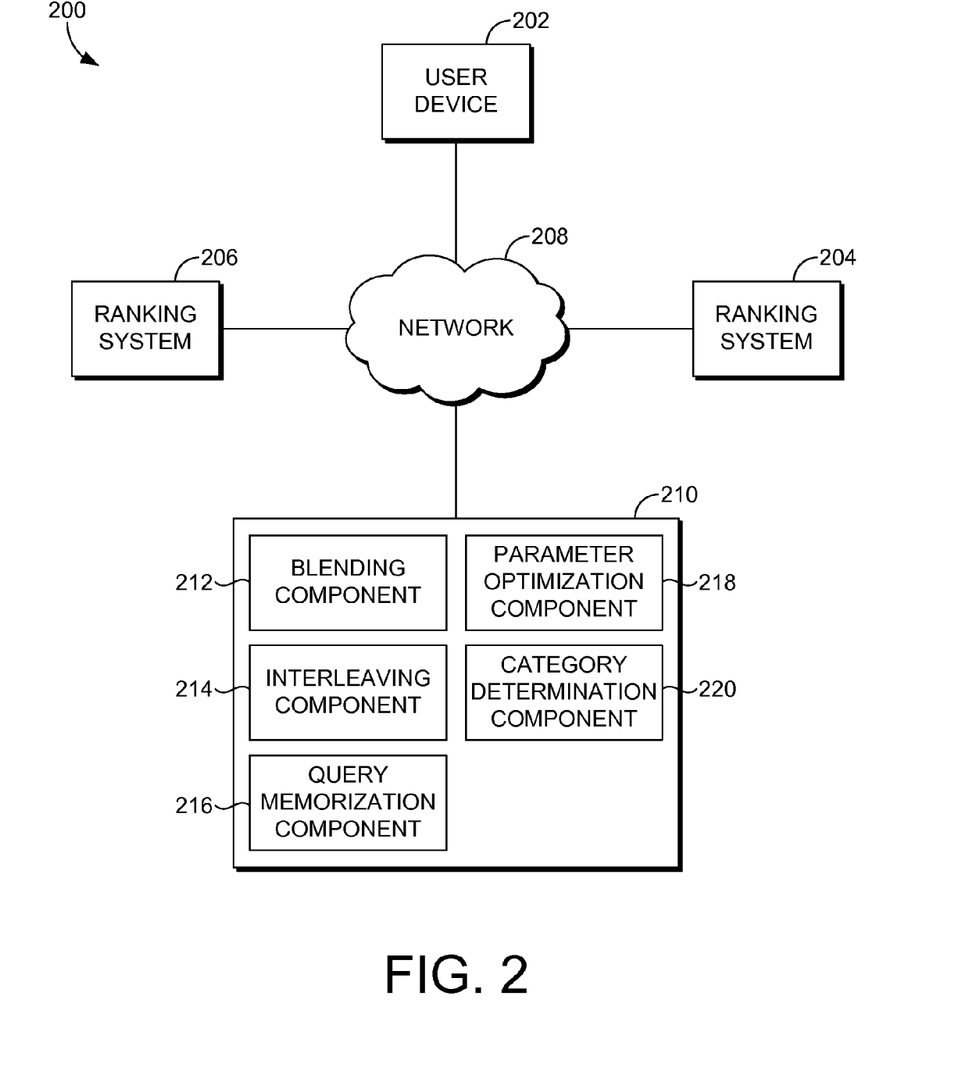
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, two ranking systems, labeled as items 204 and 206, and an interleaving engine 210. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, ranking systems, and interleaving engines may be employed within the system 200 within the scope of the present invention. Each may comprise a single device or multiple devices cooperating in a distributed environment. For instance, a ranking system, such as ranking system 204 and 206 may actually be comprised of multiple components, although not shown in FIG. 2. Additionally, other components not shown may also be included within the system 200, while components shown in FIG. 2 may be omitted in some embodiments.

The user device 202 may be any type of computing device owned and/or operated by an end user that can access network 208. For instance, the user device 202 may be a desktop computer, a laptop computer, a tablet computer, a mobile device, or any other device having network access. Generally, an end user may employ the user device 202 to, among other things, access electronic documents maintained by the system. For instance, the end user may employ a web browser on the user device 202 to access and view electronic documents that are ranked by one or more of the ranking systems 204 and 206. Prior to being presented to the user via the user device 202, the search results produced by the ranking systems 204 and 206 may be blended and interleaved with other search results to determine the blending algorithm that produces the most relevant results, such as those that are preferred by more users.

In embodiments of the present invention, multiple ranking systems may be used in conjunction with one another to produce a blended set of search results. Various blended sets of search results may be involved in an interleaving experiment. When evaluating search ranking systems or blending algorithms that incorporate search results from multiple ranking systems to form a blended set of search results, it may be beneficial to measure how users respond to search results to determine if one ranking system or blending algorithm is better than another. Typically, the number of clicks or selections of search results is used to make this determination, as it is the most easily accessible signal as to whether users are satisfied with the returned search results. Interleaving, however, can be used for interpreting these clicks on search results, as it is a more efficient and sensitive technique for accomplishing the same results. As such, in one embodiment, given two ranked sets of search results, the process of interleaving combines the two sets of results by interspersing (e.g., interleaving) the results, while also removing duplicates. This combined list is then presented to the user. When a user clicks on a search result to select that search result, the click can be mapped back to the two or more individual lists of search results that contributed to the combined list. In this way, the input ranking that contributed to more of the useful search results gets credit more often than the other input ranking and "wins" the interleaving test. Interleaving may be performed on a small number of submitted search queries, or in some cases, on a large number of search queries relative to the total quantity of search queries received in a particular search engine.

There are various algorithms used for interleaving. One of these algorithms is the Team Draft algorithm. This algorithm is described herein for exemplary purposes only and is not meant to limit the embodiments of the present invention. The Team Draft algorithm involves taking multiple input rankings, such as two input rankings. These are termed Ranker A and Ranker B, each having search results in a particular order based on a particular query. In one embodiment, Ranker A and Ranker B are actually blending algorithms that are associated with two or more individual ranking systems. The algorithm repeatedly: (1) flips an unbiased coin to determine if Ranker A goes first or Ranker B goes first; (2) the winning ranking chooses its highest ranked result that is not in the combined interleaving list and adds it to the end of the combined interleaving list; (3) the other ranking then chooses its highest ranked result that is not in the combined interleaving list and adds it to the end of the combined interleaving list; (4) when the combined interleaving list is long enough (e.g., when the desired number of search results have been identified), this list of results is presented to the user who submitted the search query; and (5) if the user clicks on any of the search results, these clicks or selections are mapped back to the input Ranker A or Ranker B that contributed the clicked or selected search results. If one of the input ranking systems gets credit for more clicked or selected results than the other, then that ranking system would win the interleaving impression or experiment. By aggregating over all search queries entered by users, it can be determined whether Ranker A or Ranker B is producing the search results preferred by the users. This tells us which ranking system or blending algorithm is better on average.

Returning to FIG. 2, the ranking systems 204 and 206 may be any type of a search system that is capable of taking an input search query and returning relevant search results based on the query. For instance, given a particular search query, search engines may use multiple indexes and ranking systems to produce a relevant set of search results. For instance, a main Web index, in addition to a most-recent index and a less-recent index may be used for identifying relevant search results. Day-old and week-old content, for instance, may be better indexed in the most-recent and less-recent indexes than the main Web index. Further, search results may be found in multimedia indexes, shopping indexes, local indexes, map indexes, etc. Other versions of the query and spelling corrections may also be formulated by the ranking systems.

In embodiments, ranking systems, such as ranking systems 204 and 206 may produce search results that are blended together to form a blended set of search results. Blending, as used herein, generally describes the process of optimizing search results by combining search results from various ranking systems together in a way that provides the most relevant and useful search results to a user based on a query. For example, for a query that is currently in the news, a blending algorithm may use the main Web index in addition to the most-recent index and blend the search results together in a way that produces the most relevant search results. If the query is increasing in popularity, more of the most-recent results may be used. But, if the query is not spiking in popularity or if search results would not be in the most-recent index, less of the search results from the most-recent index may be used in combination with more search results from the main Web index. Each ranking system or blending algorithm has one or more parameters that can be modified. In the case of blending algorithms, one or more parameters may be modified incrementally and using interleaving, the most relevant search results, as determined by user preference, can be found. While two ranking systems are illustrated in FIG. 2, other embodiments of the present invention contemplate having more than two ranking systems such that a first blending algorithm may use a first and a second ranking system, and a second blending algorithm may use a third and a fourth ranking system. Alternatively, one or more ranking systems may be common to the first and second blending algorithms.

In one embodiment, the optimal blending algorithm may be determined for queries on an individual basis. In this embodiment, the optimal blend of ranking systems is determined for frequent queries (e.g., queries that are frequently searched) by way of interleaving experiments. The parameters of the optimal blend are stored so that when that particular search query is submitted in the future, the optimal blend can be used to produce search results. Alternatively, the search results that are produced by the optimal blend can be stored. For example, by regularly interleaving different blends, the "winning" blend can be continuously stored to produce the most relevant and most updated search results. For instance, for the query "Seattle plumbers," it can be determined that some local results should be inserted in the blend. But, for the query "Seattle Mariners," it may be better to use some news results. This can all be determined via interleaving experiments for queries that are frequently received by search engines. As search results may change over time for a particular query, interleaving may be performed periodically so that the parameters of the blending algorithm can be adjusted. For instance, while the query "University of Washington" would typically not need search results that are the newest and most updated, such as those that may not be included in a main Web index. But, if a major news event happens that is associated with the University of Washington, these results may be crucial in providing the most relevant search results to a user. In this instance, a blend of the most recent news results and results associated with social networking sites may prove to be preferred by users. As such, interleaving experiments may be performed periodically and on a regular basis so that the blending algorithm can be updated. In one embodiment, the optimal blending algorithm may also be used for more infrequent queries.

In another embodiment, and as mentioned above, ranking systems 204 and 206 may have one or more parameters that can be adjusted in various increments. Using interleaving experiments may allow the optimal blending algorithm to be identified. For instance, a first blending algorithm may produce search results having weak or few of the most recent results (e.g., few results from the news) in the top ten search results, but a second blending algorithm may produce search results having a greater amount of the most recent results, such as news results. Interleaving experiments are able to determine that the search results with a greater amount of news stories are more preferred by users for a particular query or category of queries. This process tunes or optimizes the blending algorithm via interleaving. In one instance, there is a parameter that controls the aggressiveness of blending using recent news stories. Using embodiments of this invention, this parameter can be tuned by trying enough parameter settings so that the optimal blend can be found. In one embodiment, the best blend of search results may turn out to be search results all coming from a single ranking system such that blending search results from multiple ranking systems is not preferred by users for a particular query or category of queries. Further, parameters other than those described above may be tuned and optimized in the same way, and are contemplated to be within the scope of the present invention.

In yet a further embodiment, search queries may be assigned to one or more categories. A blending algorithm may be determined to be optimal for a particular category of search queries. Two approaches may be used in this embodiment. In a first approach, search queries are divided into easily defined categories. Within each category, interleaving signals are aggregated, including those for infrequent queries. Signals from queries that are submitted only once can still be aggregated into an overall preference for a first ranking system and a second ranking system. This allows for a particular blend of ranking systems to be determined to produce the most relevant search results for a particular category of search queries. A second approach is to use a simple decision tree or other machine learning approach to divide search queries into categories. The decision boundaries may be data driven, which could increase the accuracy of the model.

Returning once again to FIG. 2, the interleaving engine 210 comprises various components, including a blending component 212, an interleaving component 214, a query memorization component 216, a parameter optimization component 218, and a category determination component 220. While not shown in FIG. 2, other components may also be used to carry out embodiments of the present invention, as described herein. Generally, the blending component is responsible for blending search results from multiple ranking systems in a particular manner. For instance, two individual ranking systems, such as ranking systems 204 and 206 may produce individual sets of search results for a particular query. Based on previously performed interleaving experiments, the blending component 212 knows the optimal or preferred way of blending the individual search results. The interleaving component 214 is responsible for interleaving multiple sets of blended search results. For instance, the blending component 212 may communicate two or more blended sets of search results to the interleaving component 214 so that the interleaving component 214 can perform interleaving experiments on the blended sets of search results to determine which set, based on user preferences, includes the most relevant search results. As mentioned, this may be determined by user clicks on the search results.

The query memorization component 216 is responsible for memorizing and storing optimal blending algorithms for a particular search query or for a particular category of search queries. The parameter optimization component 218 modifies various parameters associated with ranking systems to identity the optimal blending algorithm, as determined by interleaving experiments performed on two or more blending algorithms. As previously described a parameter may be modified in increments to determine the optimal blending algorithm. For instance, if the parameter controls how many or the percentage of search results associated with recent news events are blended into a blended set of search results, this parameter can be adjusted so that interleaving experiments can determine which version of the blending algorithm produces the search results that are most preferred by users to submit a particular query or for a particular category of search results. The category determination component 220 is responsible for determining or identifying categories to which search results belong. Categories may be manually determined, such as with user intervention, or may be automatically determined, such as by a machine learning tool.

Figure 3:
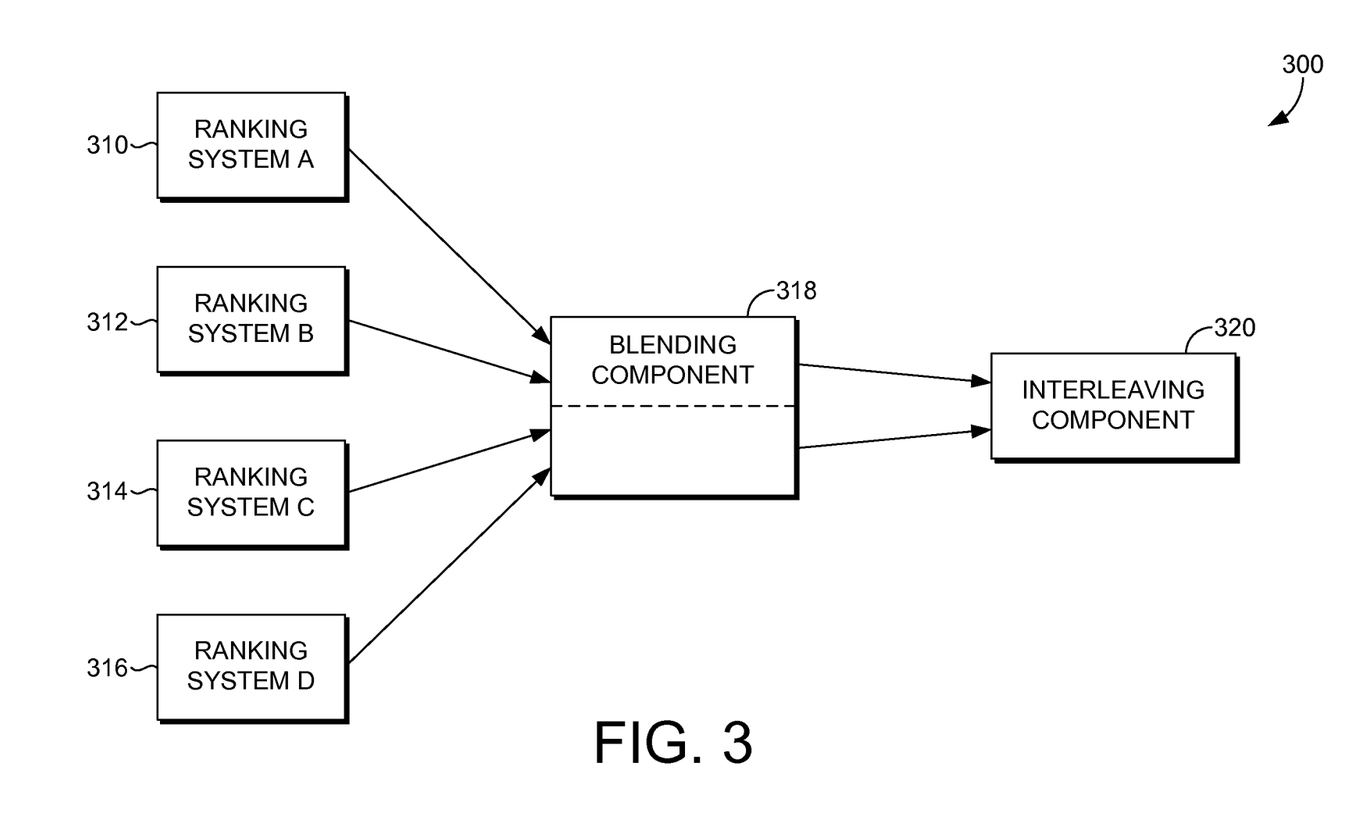
FIG. 3 is a block diagram of a system for interleaving blended search results, in accordance with embodiments of the present invention.

FIG. 3 is a block diagram of a system 300 for interleaving blended search results, in accordance with embodiments of the present invention. Initially, four ranking systems are illustrated here, including ranking system A (item 310), ranking system B (item 312), ranking system C (item 314), and ranking system D (item 316). Two or more ranking systems may be used to carry out aspects of the present invention. Further, in one embodiment, two of the ranking systems shown in FIG. 3 may actually be the same ranking system. A blending component 318 receives search results from multiple ranking systems (e.g., two or more ranking systems) and blends the search results in a particular manner. In embodiments, the blending component 318 knows how to blend the search results and knows if it is supposed to modify a parameter when blending the search results. For instance, if the parameter is how many or the percentage of video search results to include in the blended search results, the blending component 318 may know the value of this parameter before blending the search results. The blending component 318 may be one component as shown in FIG. 3, or may be multiple components that have similar functionality. As shown here, the search results for a particular query are received at the blending component 318 from ranking system A (item 310) and ranking system B (item 312), and from ranking system C (item 314) and ranking system D (item 316). The broken line is shown in the blending component 318 to illustrate that the blended search results are kept separate so that interleaving can take place. Once blended, the first and second sets of blended search results are sent to the interleaving component 320, which is responsible for interleaving the results together. Once sent to users based on their submitted search queries, the interleaving component 320 is able to determine which set of blended search results are more preferred by users. This may be determined by user clicks or selections of the particular search queries.

Figure 4:
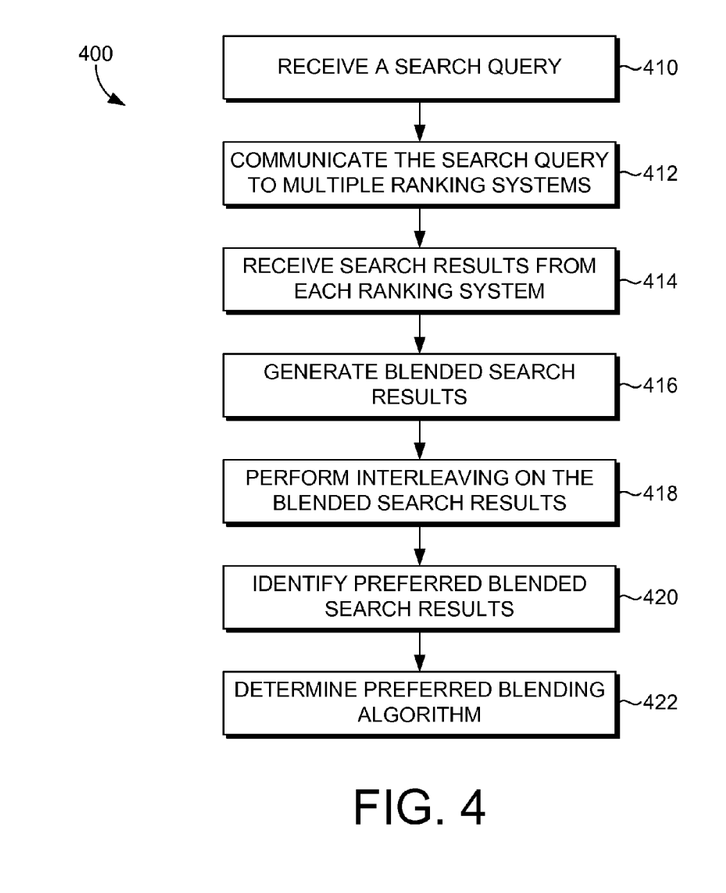
FIGS. 4-6 are flow diagrams showing methods for interleaving blended search results, in accordance with embodiments of the present invention.

Turning now to FIG. 4, a flow diagram is shown of a method 400 for interleaving blended search results, in accordance with an embodiment of the present invention. Initially at step 410, a search query is received. At step 412, the search query is communicated to multiple ranking systems. At this step, it may be known how the search results from the multiple ranking systems will be blended to generate a blended set of search results. At step 414, search results from each ranking system are received. Two or more sets of blended search results are generated at step 416. Each set of blended search results is comprised of a portion of the search results received from two or more of the ranking systems. The determination as to how the search results are blended together, in one embodiment, is an iterative process based on modification of one or more parameters, such as how many search results from a certain search index or search system should be included in the blended search results. For instance, the particular proportion of search results used from one of the ranking systems may be determined by a parameter that can be modified.

At step 418, interleaving is performed on the blended search results. This allows for an identification, at step 420, of the preferred blended search results. This process may be repeated many times with parameter adjustments to identify the set of blended search results that is most preferred by users who submit a particular search query. Based on the preferred blended search results, the preferred blending algorithm, which actually blends search results received from multiple ranking systems, is determined. The preferred blending algorithm may be associated with the query or category of queries and stored so that it can be used next time the search query or search query in that category is submitted to a search engine. Once the preferred blending algorithm is identified, a parameter may be adjusted to generate an adjusted preferred blending algorithm. Further interleaving experiments may be performed based on the preferred blending algorithm and the adjusted preferred blending algorithm. A new preferred blending algorithm, either the preferred blending algorithm or the adjusted blending algorithm, is identified at step 422.

As previously mentioned, blending and interleaving, as described herein, may be used to identify a preferred set of blended search results for individual queries (e.g., frequent queries) or for categories of queries. For instance, for search queries that are short, a particular blending algorithm may be best suited to produce a set of blended search results that are most preferred by users. But, for search queries that are infrequent, another blending algorithm may produce preferred search results. Categories may also include subject matter associated with queries, such as movies, authors, singers, cooking/recipes, sports, etc. There are many categories into which search queries may be divided, although just a few are mentioned here. As such, when a search query is received, such as at step 410, it may be determined that the search query belongs to a certain category of search queries having at least one common trait. It may then be determined that the blending algorithm produces search results that are preferred by the users who submit the search queries that belong to that particular category of search queries. The blending algorithm is then associated with the category of search queries. In an embodiment, multiple blending algorithms are associated with a particular search query or category or search queries. In the instance where a query is classified in more than one group or category, one of the categories may have priority over others. For instance, the category for long queries may have priority over the category of rare queries such that the query would be treated as "not long and rare."

Figure 5:
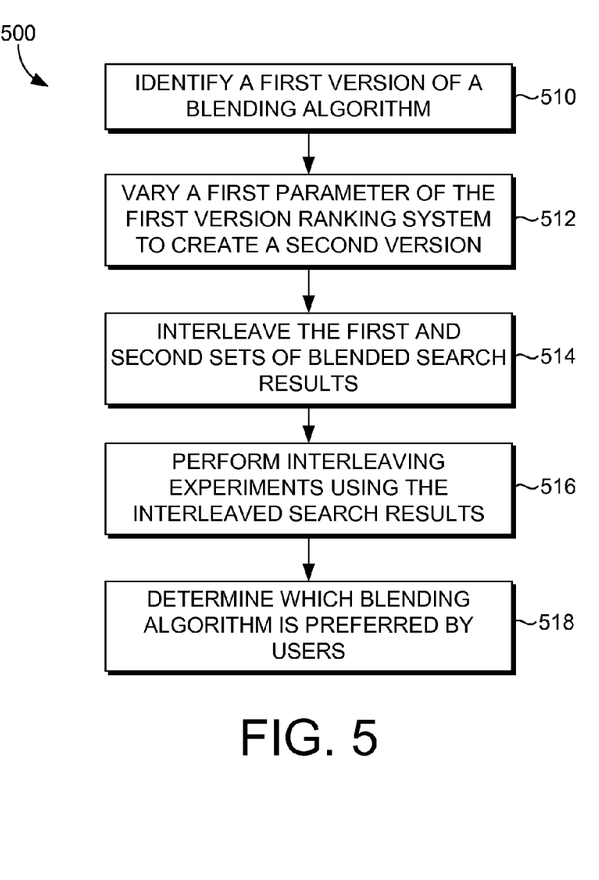

Referring now to FIG. 5, a flow diagram is shown of a method 500 for interleaving blended search results, in accordance with an embodiment of the present invention. At step 510, a first version of a blending algorithm is identified. This blending algorithm blends search results produced by a first ranking system and a second ranking system to produce a first set of blended search results based on a search query. At step 512, a first parameter of the first version ranking system is varied or adjusted to create a second version of the blending algorithm. This blending algorithm produces a second set of blended search results based on the search query. The first parameter may be one of many types of parameters, such as a strength indicator that the search results produced by the first ranking system are incorporated into the first set of blended search results. The first and second sets of blended search results are interleaved at step 514 to generate an interleaved set of search results. As previously mentioned, interleaving and blending are different, in that interleaving treats each set of blended search results fairly by intermingling the search results into an interleaved set of search results, whereas blending uses specified parameters to adjust how the multiple sets of search results are combined. Some blending algorithms may specify that search results from a particular ranking system get put ahead of other search results so that the user sees those first. This may be specified by a parameter.

At step 516, interleaving experiments are performed for the search query using the interleaved set of search results. Interleaving experiments, in one embodiment, involve presenting the interleaved set of search results to a user who submits a query associated with those search results, and mapping the user clicks back to the respective blending algorithm to determine which is preferred by users. At step 518, based on the interleaving experiments, it is determined which of the first or second versions of the blending algorithm is preferred by users who receive the interleaved set of search results. In one embodiment of FIG. 5, both the first and second versions of the blending algorithm use search results from the first and second ranking systems. The difference is that one or more parameters have been adjusted.

In one embodiment, the second version of the blending algorithm is preferred by the users who receive the interleaved set of search results. A second parameter may then be varied to create a third version of the blending algorithm that produces a third set of blended search results based on the search query. The third set of blended search results are interleaved with the second set of blended search results, which was preferred by users based on the previous interleaving experiments. Further interleaving experiments are performed using the new interleaved set of search results. Based on these experiments, it is determined whether the second version or the third version of the blending algorithm is preferred by the users who submit the search query.

In an alternative embodiment, instead of varying a second parameter, the first parameter may be varied again to create a third version of the blending algorithm that produces a third set of blended search results based on the search query. The second and third sets of blended search results are interleaved to generate a new interleaved set of search results. Interleaving experiments are performed and based on these, it is determined which of the second version or the third version of the blending algorithm is preferred by the users who submit the search query.

Figure 6:
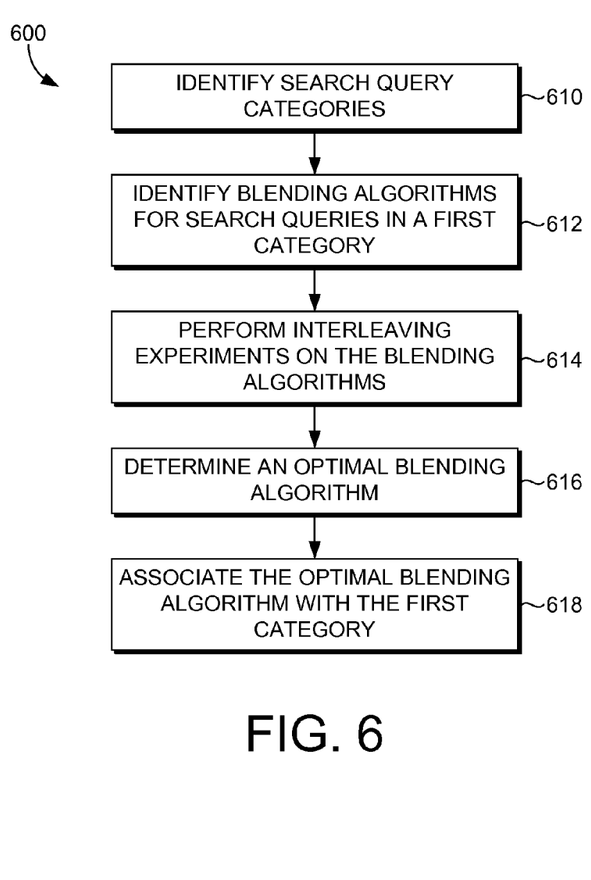

FIG. 6 is a flow diagram of a method 600 for interleaving blended search results, in accordance with an embodiment of the present invention. Initially at step 610, search query categories are identified. As mentioned, search query categories may represent the type of query, such as long, short, frequent, infrequent, or may represent a subject matter associated with the queries. Blending algorithms for search queries that belong to a first category are identified at step 612. In embodiments, two or more blending algorithms are identified that blend search results produced by two or more ranking systems to generate blended search results that are preferred by users who submit the search queries that belong to the first category. The blending algorithms may have been previously determined to produce relevant search results by performing interleaving experiments and gradually adjusting one or more parameters of the blending algorithm. At step 614, interleaving experiments are performed on the two or more blending algorithms. Based on these experiments, an optimal blending algorithm is determined at step 616. At step 618, the optimal blending algorithm is associated with the first category of search queries. This association may be stored in a database.

Even further, a search query that belongs to the first category of search queries may be received once the association is made. It is determined that the first category of search queries is associated with the optimal blending algorithm. Search results are provided to the user based on the received search query, wherein the search results are produced by the optimal blending algorithm. In one embodiment, at least one of the ranking systems used in the two or more blending algorithms is different. For instance, a first blending algorithm may use search results from ranking system A and ranking system B, and a second blending algorithm may use search results from ranking system A and ranking system C. But, in other embodiments, the same two or more ranking systems are used in the blending algorithms. Even further, the ranking systems used in each of the blending algorithms may be completely different and may not overlap at all.

In one embodiment, for search queries that belong to a second category of search queries, two or more blending algorithms may be identified that blend search results produced by various ranking systems to generate blended search results that are preferred by users who submit the search queries in the second category. Interleaving experiments are performed on the blending algorithms to determine the optimal blending algorithm. The optimal blending algorithm is then associated with the second category of search queries. This process may be repeated for any number of search query categories.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. One or more tangible computer-readable media storing computer-useable instructions that, when used by a computing device, cause the computing device to perform a method for performing interleaving experiments on blended search results, the method comprising:
   receiving a search query;
   communicating the received search query to multiple ranking systems;
   receiving a set of search results from each of the multiple ranking systems;
   generating two or more sets of blended search results to be used in the interleaving experiments, wherein each set of the generated two or more sets of blended search results is comprised of a portion of the received set of search results from two or more of the multiple ranking systems;
   performing the interleaving experiments on the generated two or more sets of blended search results to identify preferred blended search results;
   based on the identified preferred blended search results, determining a preferred blending algorithm; and
   utilizing the determined preferred blending algorithm to blend search results for subsequent searches.

2. The one or more tangible computer-readable media of claim 1, further comprising associating the determined preferred blending algorithm with the received search query.

3. The one or more tangible computer-readable media of claim 2, further comprising storing the association of the determined preferred blending algorithm and the received search query so that the determined preferred blending algorithm can be used next time the received search query is submitted to a search engine.

4. The one or more tangible computer-readable media of claim 1, further comprising:
   determining that the received search query belongs to a category of search queries having at least one common trait;
   determining that the determined preferred blending algorithm produces search results that are preferred by the users who submit search queries that belong to the category of search queries having the at least one common trait; and
   associating the determined preferred blending algorithm with the category of search queries having the at least one common trait.

5. The one or more tangible computer-readable media of claim 1, wherein each set of the generated two or more sets of blended search results comprises the portion of the search results received from the two or more of the multiple ranking systems in a particular proportion, wherein the particular proportion is determined by a parameter of the determined preferred blending algorithm.

6. The one or more tangible computer-readable media of claim 5, further comprising:

adjusting the parameter of the determined preferred blending algorithm to generate an adjusted preferred blending algorithm;

performing further interleaving experiments based on the determined preferred blending algorithm and the generated adjusted preferred blending algorithm; and based on the performed further interleaving experiments, determining a new preferred blending algorithm.

7. One or more tangible computer-readable media storing computer-useable instructions that, when used by a computing device, cause the computing device to perform a method for performing interleaving experiments on blended search results, the method comprising:

identifying a first version of a blending algorithm that blends search results produced by a first ranking system and search results produced by a second ranking system to produce a first set of blended search results based on a search query;

varying a first parameter of the first ranking system to create a second version of the blending algorithm that produces a second set of blended search results based on the search query;

interleaving the produced first set of the blended search results and the produced second set of the blended search results to generate an interleaved set of search results;

performing an interleaving experiment for the search query using the generated interleaved set of search results; and based on the performed interleaving experiment, determining which of the identified first version of the blending algorithm or the created second version of the blending algorithm is preferred by users who receive the generated interleaved set of search results.

8. The one or more tangible computer-readable media of claim 7, wherein the created second version of the blending algorithm uses the search results produced by the first ranking system and the search results produced by the second ranking system.

9. The one or more tangible computer-readable media of claim 7, wherein the created second version of the blending algorithm is preferred by the users who receive the generated interleaved set of search results.

10. The one or more tangible computer-readable media of claim 9, further comprising:

varying a second parameter of the first ranking system to create a third version of the blending algorithm that produces a third set of the blended search results based on the search query;

interleaving the produced third set of the blended search results and the produced second set of the blended search results to generate a new interleaved set of the search results;

performing the interleaving experiment for the search query using the generated new interleaved set of the search results; and based on the performed interleaving experiment, determining which of the created second version of the blending algorithm or the created third version of the blending algorithm is preferred by the users who submit the search query.

11. The one or more tangible computer-readable media of claim 9, further comprising:

varying the first parameter of the second ranking system to create a third version of the blending algorithm that produces a third set of the blended search results based on the search query;

interleaving the produced second set of the blended search results and the produced third set of the blended search results to generate a new interleaved set of search results;

performing the interleaving experiment for the search query using the generated new interleaved set of search results; and based on the performed interleaving experiment, determining which of the created second version of the blending algorithm or the created third version of the blending algorithm is preferred by the users who submit the search query.

12. The one or more tangible computer-readable media of claim 7, wherein the blending algorithm optimizes the search results returned to a user by blending the search results produced by the first ranking system and the second ranking system in a particular proportion.

13. The one or more tangible computer-readable media of claim 7, wherein the first parameter indicates a level of strength that the search results produced by the first ranking system are incorporated into the first set of blended search results.

14. One or more tangible computer-readable media storing computer-useable instructions that, when used by a computing device, cause the computing device to perform a method for performing interleaving experiments on blended search results, the method comprising:

identifying a plurality of search query categories;

for search queries that belong to a first category of search queries of the identified plurality of search query categories, identifying two or more blending algorithms that blend search results produced by two or more ranking systems to generate blended search results;

generating two or more sets of the blended search results from the identified two or more blending algorithms;

performing the interleaving experiments on the generated two or more sets of the blended search results from the identified two or more blending algorithms to determine an optimal blending algorithm;

associating the determined optimal blending algorithm with the first category of search queries: and utilizing the determined optimal blending algorithm to blend search results when a search query in the first category of search queries is received.

15. The one or more tangible computer-readable media of claim 14, further comprising:

receiving a search query that belongs to the first category of search queries;

determining that the first category of search queries is associated with the determined optimal blending algorithm; and providing search results based on the received search query, wherein the search results are produced by the determined optimal blending algorithm.

16. The one or more tangible computer-readable media of claim 14, wherein at least one ranking system used by each of the two or more blending algorithms is different.

17. The one or more tangible computer-readable media of claim 14, wherein the determination of the optimal blending algorithm is based on a user selection of the search results that are mapped to the blending algorithm of the identified two or more blending algorithms that produced the selected search result.

18. The one or more tangible computer-readable media of claim 14, wherein the identified plurality of search query categories include one or more of long queries, short queries, frequent queries, or infrequent queries.

19. The one or more tangible computer-readable media of claim 14, wherein one or more of the identified plurality of search query categories describe a subject matter of the search queries in the search query category.

20. The one or more tangible computer-readable media of claim 14, further comprising:
- for the search queries that belong to a second category of search queries of the identified plurality of search query categories, identifying the two or more blending algorithms that blend search results produced by the two or more ranking systems to generate blended search results that are preferred by users who submit the search queries in the second category of search queries;
- performing interleaving experiments on the identified two or more blending algorithms to determine the optimal blending algorithm; and
- associating the determined optimal blending algorithm with the second category of search queries.

\* \* \* \* \*